(12) United States Patent
Natarajan et al.

(10) Patent No.: US 11,120,486 B2
(45) Date of Patent: Sep. 14, 2021

(54) SYSTEMS AND METHODS FOR DISTRIBUTING ONLINE ADVERTISEMENTS

(71) Applicant: WAL-MART STORES, INC., Bentonville, AR (US)

(72) Inventors: Girish Nath Natarajan, Fremont, CA (US); Chintan Jagdish Rita, Sunnyvale, CA (US); Venkata Pranay Kumar Sowdaboina, Sunnyvale, CA (US)

(73) Assignee: WALMART APOLLO LLC, Bentonville, AR (US)

( * ) Notice: Subject to any disclaimer, the term of this patent is extended or adjusted under 35 U.S.C. 154(b) by 283 days.

(21) Appl. No.: 15/657,606

(22) Filed: Jul. 24, 2017

(65) Prior Publication Data
US 2019/0026801 A1    Jan. 24, 2019

(51) Int. Cl.
*G06Q 30/06* (2012.01)
*G06Q 30/02* (2012.01)

(52) U.S. Cl.
CPC ..... *G06Q 30/0601* (2013.01); *G06Q 30/0254* (2013.01); *G06Q 30/0277* (2013.01); *G06Q 30/0641* (2013.01); *G06Q 30/02* (2013.01)

(58) Field of Classification Search
CPC .......... G06Q 30/0601; G06Q 30/0641; G06Q 30/0277; G06Q 30/0254; G06Q 30/02
USPC .................................................... 705/14.73
See application file for complete search history.

(56) References Cited

U.S. PATENT DOCUMENTS

| | | | |
|---|---|---|---|
| 7,930,384 B1* | 4/2011 | Lester .................... | G06Q 30/02 705/14.41 |
| 8,732,010 B1* | 5/2014 | Parikh .................... | G06Q 90/00 705/14.1 |
| 2003/0226142 A1* | 12/2003 | Rand ...................... | H04N 7/165 725/32 |
| 2011/0185016 A1 | 7/2011 | Kandasamy et al. | |
| 2012/0310728 A1* | 12/2012 | Kagan .................... | G06Q 30/02 705/14.43 |
| 2013/0145022 A1* | 6/2013 | Srivastava ......... | G06Q 30/0241 709/224 |

(Continued)

OTHER PUBLICATIONS

"The Internet as an Enabler for Dynamic Pricing of Goods" Author: Vaidyanathan Jayarman and Tim Baker IEEE Transactions on Engineering Management (Year: 2003).*

*Primary Examiner* — Victoria E Frunzi
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of creating a unique identification (UID) for an online advertisement for an item available for sale from an online retailer, publishing the online advertisement with the UID for the item in an online medium of the online retailer, receiving a user selection of the online advertisement with the UID, coordinating displaying a landing webpage for the item from the online retailer on an interface of the user electronic device, recording the user selection of the online advertisement with the UID in an event log, and extracting the UID from the event log to track clicks of the online advertisement when published.

20 Claims, 6 Drawing Sheets

(56) References Cited

U.S. PATENT DOCUMENTS

| | | | |
|---|---|---|---|
| 2013/0332262 A1* | 12/2013 | Hunt | G06Q 30/02 |
| | | | 705/14.43 |
| 2014/0074613 A1* | 3/2014 | Tofighbakhsh | G06Q 30/0241 |
| | | | 705/14.64 |
| 2015/0127470 A1* | 5/2015 | Ghosh | G06Q 30/0275 |
| | | | 705/14.71 |
| 2015/0170209 A1* | 6/2015 | Smith | G06Q 30/0267 |
| | | | 705/14.64 |
| 2015/0227968 A1* | 8/2015 | Murphy, Jr. | G06Q 10/083 |
| | | | 705/14.49 |
| 2017/0180229 A1* | 6/2017 | Toksoz | H04L 43/0876 |
| 2018/0047048 A1* | 2/2018 | Mielechowicz | G06Q 30/0243 |

* cited by examiner

400

---

405 – Creating a UID for an online advertisement for an item available for sale from an online retailer.

↓

410 – Publishing the online advertisement with the UID for the item in an online medium of the online retailer.

↓

415 – In response to publishing the online advertisement, receiving, from a user electronic device, a user selection of the online advertisement with the UID.

↓

420 – In response to receiving the user selection, coordinating displaying a landing webpage for the item from the online retailer on an interface of the user electronic device.

↓

425 – Recording the user selection of the online advertisement with the UID in an event log.

↓

430 – Extracting the UID from the event log to track clicks of the online advertisement when published.

FIG. 4

SYSTEMS AND METHODS FOR DISTRIBUTING ONLINE ADVERTISEMENTS

TECHNICAL FIELD

This disclosure relates generally to distribution of online product advertisements to various publishers and click tracking of online product advertisements.

BACKGROUND

Conventional systems for distributing online advertisements include various technological problems, both in the distribution of the online advertisement and also in the tracking of online advertisement clicks. With respect to distribution of the online advertisement, problems can occur with system latency, relevance, "tight coupling" of the advertisement platform and publisher, and project launch delays. For example, system latency can occur from distribution of online advertisements through search queries and/or emails have a negative effect on the system latency. By way of another example, the relevance of online advertisements can be decreased because advertisement ranking can differ across various items and products. By way of another example, tight coupling is required between the advertisement platform and the advertisement publisher because any change in the advertisement requires changes and development effort at both the advertisement platform and the advertisement publisher. Moreover, project launch delays can occur due to longer development cycles that result from the tight coupling between the advertisement platform and the advertisement publisher.

With respect to technological problems in the tracking of online advertisements, technological problems can occur as a result of the necessity of a redirect server. Conventional advertisement systems redirect customers from the advertisement through one or more redirect servers before finally ending at the landing webpage that displays more information pertaining to the advertisement. A redirect is an instance of re-routing an electronic device from one web address to another before ending at the desired landing webpage. Redirects significantly increase latency within the advertisement system, and also result in a high drop off rate during the redirects. It is common for conventional systems to have at least four or five hops or stops during the redirect process. Moreover, a highly reliable redirect server is required in conventional advertisement systems.

BRIEF DESCRIPTION OF THE DRAWINGS

To facilitate further description of the embodiments, the following drawings are provided in which:

FIG. 4 is a flowchart for a method, according to certain embodiments;

Figure 1:
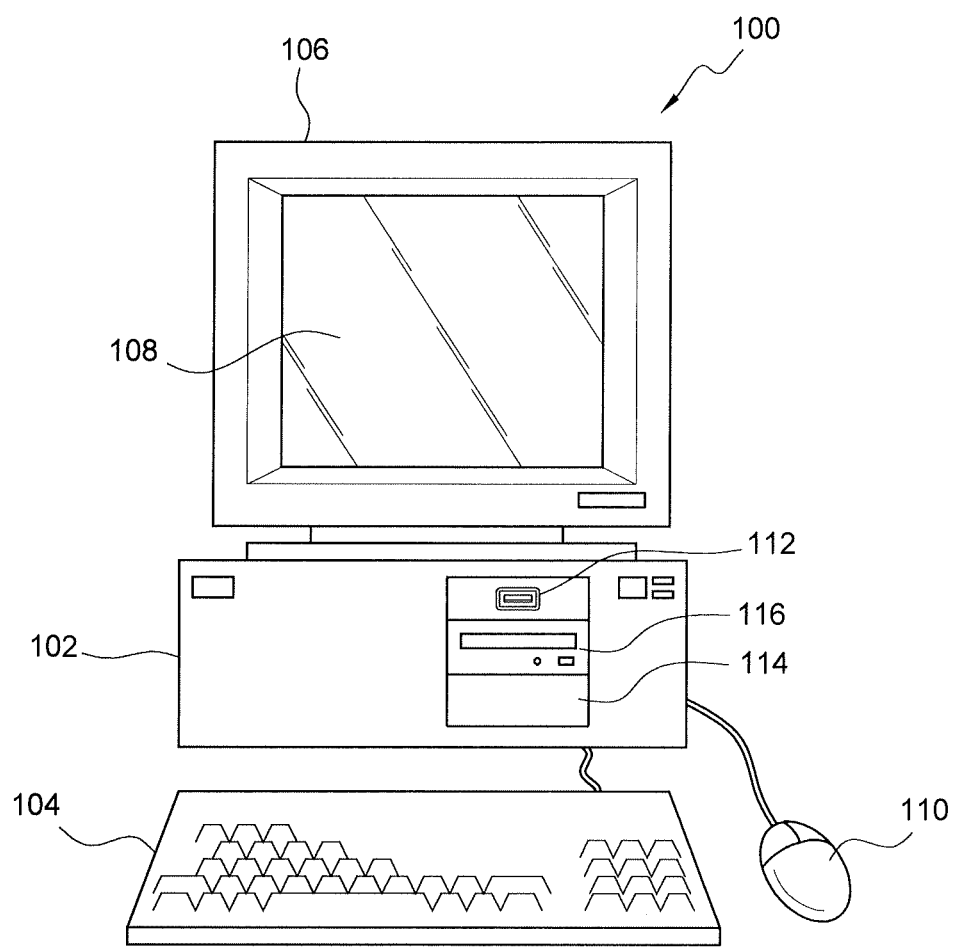
FIG. 1 illustrates a front elevational view of a computer system that is suitable for implementing various embodiments of the systems disclosed in FIGS. 3, 5, and 6.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of creating, with an advertisement system of an online retailer, a unique identification (UID) for an online advertisement for an item available for sale from an online retailer. The one or more storage modules can be further configured to run on the one or more processing modules and perform an act of publishing, with a publisher of the online retailer, the online advertisement with the UID for the item in an online medium of the online retailer. The one or more storage modules can be further configured to run on the one or more processing modules and perform an act of, in response to publishing the online advertisement, receiving, from a user electronic device, a user selection of the online advertisement with the UID. The one or more storage modules can be further configured to run on the one or more processing modules and perform an act of, in response to receiving the user selection, coordinating displaying a landing webpage for the item from the online retailer on an interface of the user electronic device. The one or more storage modules can be further configured to run on the one or more processing modules and perform an act of recording the user selection of the online advertisement with the UID in an event log. The one or more storage modules can be further configured to run on the one or more processing modules and perform an act of extracting, with the advertisement system, the UID from the event log to track clicks of the online advertisement when published.

Various embodiments include a method. The method can include creating, with an advertisement system of an online retailer, a UID for an online advertisement for an item available for sale from an online retailer. The method also can include publishing, with a publisher of the online retailer, the online advertisement with the UID for the item in an online medium of the online retailer. The method also can include, in response to publishing the online advertisement, receiving, from a user electronic device, a user selection of the online advertisement with the UID. The method also can include, in response to receiving the user selection, coordinating displaying a landing webpage for the item from the online retailer on an interface of the user electronic device. The method also can include recording the user selection of the online advertisement with the UID in an event log. The method also can include extracting, with the advertisement system, the UID from the event log to track clicks of the online advertisement when published.

Figure 2:
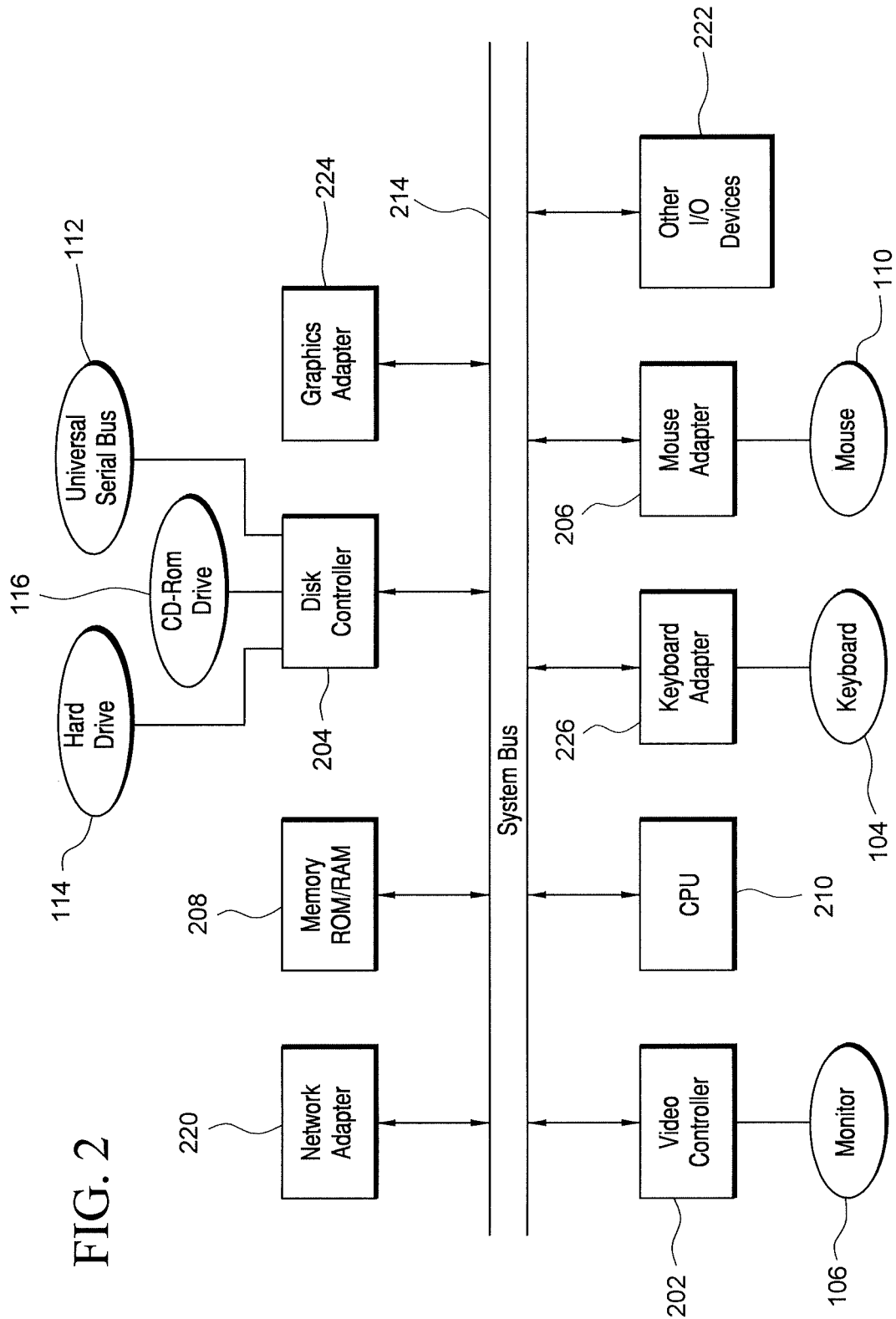
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
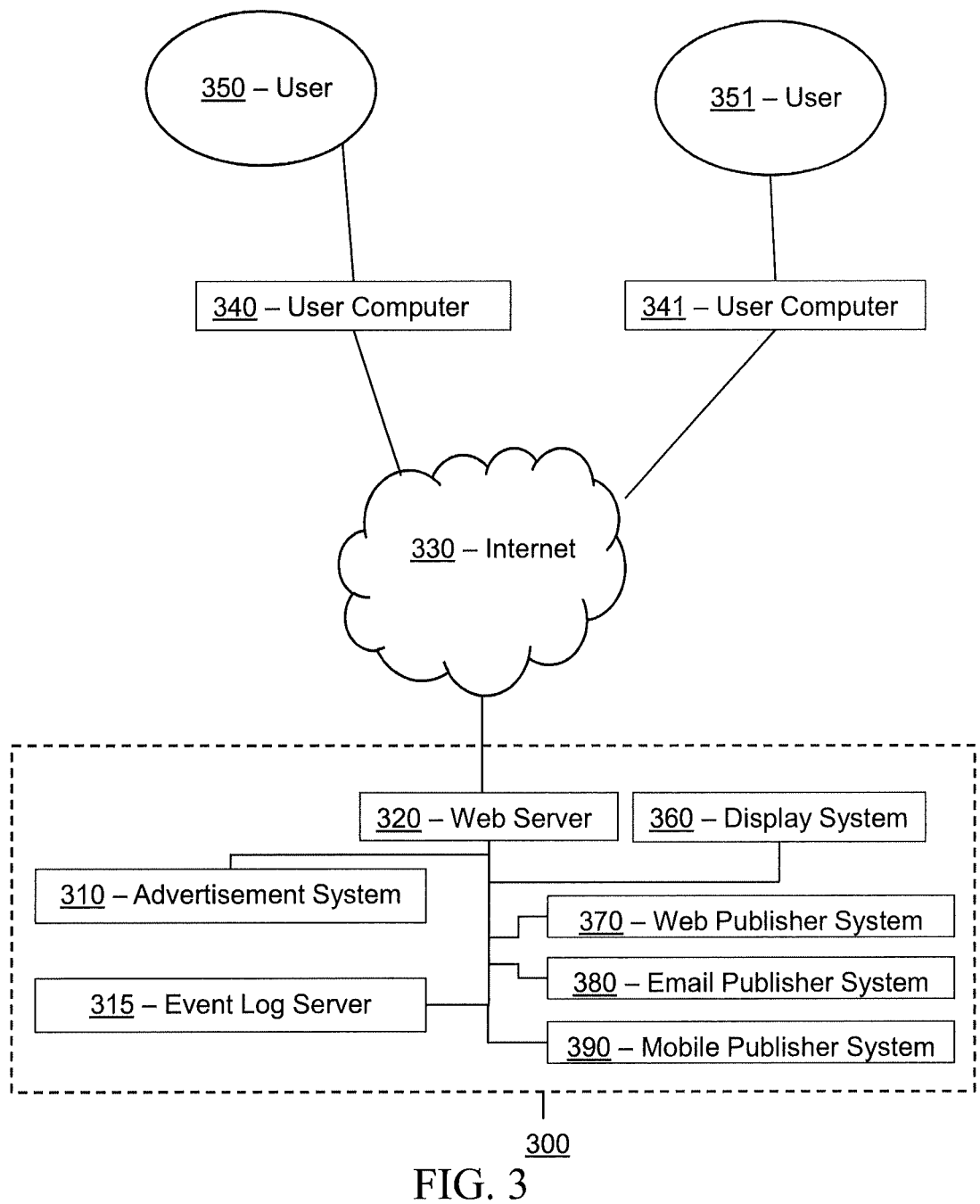
FIG. 3 illustrates a representative block diagram of a system, according to an embodiment.

Turning ahead in the drawings, FIG. 3 illustrates a block diagram of a system 300 that can be employed for distributing online advertisements, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include an advertisement system 310, an event log server 315, a web server 320, a display system 360, a web publisher system 370, an email publisher system 380, and a mobile publisher system 390. Advertisement system 310, event log server 315, web server 320, display system 360, web publisher system 370, email publisher system 380, and mobile publisher system 390 can each be a computer system, such as computer system 100 (FIG. 1), as described above, and can each be a single computer, a single server, or a cluster or collection of computers or servers, or a cloud of computers or servers. In another embodiment, a single computer system can host each of two or more of advertisement system 310, event log server 315, web server 320, display system 360, web publisher system 370, email publisher system 380, and/or mobile publisher system 390. Additional details regarding parameter advertisement system 310, event log server 315, web server 320, display system 360, web publisher system 370, email publisher system 380, and/or mobile publisher system 390 are described herein.

In many embodiments, system 300 also can comprise user computers 340, 341. User computers 340, 341 can comprise any of the elements described in relation to computer system 100. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce web site that allows users to browse and/or search for products, to add products to an electronic shopping cart, and/or to purchase products, in addition to other suitable activities.

In many embodiments, advertisement system 310, event log server 315, web server 320, display system 360, web publisher system 370, email publisher system 380, and/or mobile publisher system 390 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) advertisement system 310, event log server 315, web server 320, display system 360, web publisher system 370, email publisher system 380, and/or mobile publisher system 390 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of advertisement system 310, event log server 315, web server 320, display system 360, web publisher system 370, email publisher system 380, and/or mobile publisher system 390. In a similar manner, the processing module(s) and the memory storage module(s) can be local and/or remote to each other.

In many embodiments, advertisement system 310, event log server 315, web server 320, display system 360, web publisher system 370, email publisher system 380, and/or mobile publisher system 390 can be configured to communicate with one or more user computers 340 and 341. In some embodiments, user computers 340 and 341 also can be referred to as customer computers. In some embodiments, advertisement system 310, event log server 315, web server 320, display system 360, web publisher system 370, email publisher system 380, and/or mobile publisher system 390 can communicate or interface (e.g., interact) with one or more customer computers (such as user computers 340 and 341) through a network or internet 330. Internet 330 can be an intranet that is not open to the public. Accordingly, in many embodiments, advertisement system 310, event log server 315, web server 320, display system 360, web publisher system 370, email publisher system 380, and/or mobile publisher system 390 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, advertisement system 310, event log server 315, web server 320, display system 360, web publisher system 370, email publisher system 380, and/or mobile publisher system 390 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, Postgr-eSQL Database, Microsoft SQL Server Database, Oracle Database, SAP (Systems, Applications, & Products) Database, and IBM DB2 Database.

Meanwhile, communication between advertisement system 310, event log server 315, web server 320, display system 360, web publisher system 370, email publisher system 380, mobile publisher system 390, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 5:
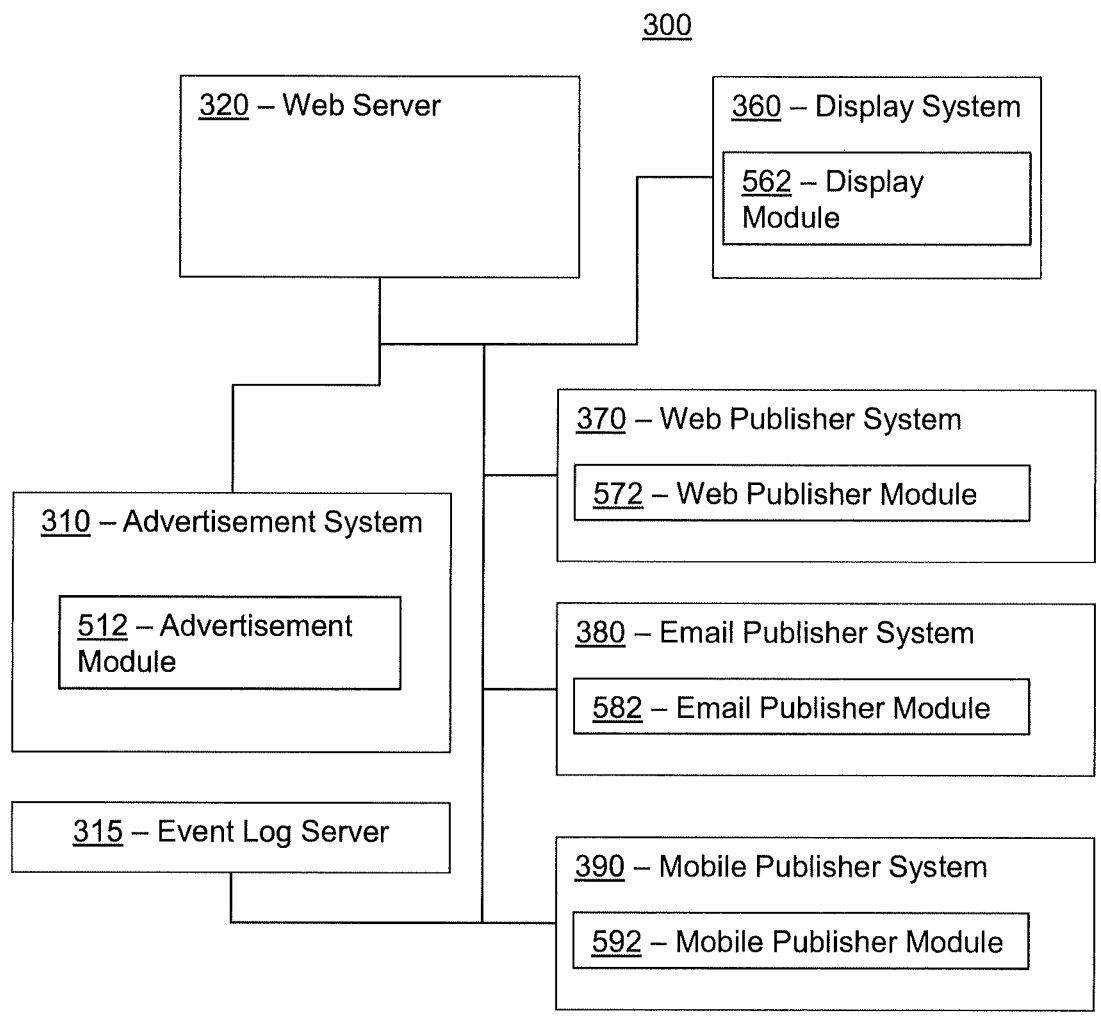
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 562, 572, 582, and/or 592 (FIG. 5). Such non-transitory memory storage modules can be part of a computer system such as advertisement system 310, event log server 315, web server 320, display system 360, web publisher system 370, email publisher system 380, and/or mobile publisher system 390 (FIGS. 3 and 5). The processing module(s) can be similar or identical to the processing module(s) described above with respect to computer system 100 (FIG. 1).

Online advertisements contribute significantly to the revenue of online retailers. Online advertisements can be displayed in various forms, such as but not limited webpage advertisements displayed on a webpage, email advertisements displayed in an email, and/or mobile application advertisements displayed on a page of a mobile application for the online retailer. A technical problem associated with online advertisements is integrating and tracking online advertisement impressions and clicks. An online advertisement impression indicates a customer has viewed the online advertisement, and an online advertisement click indicates a customer has clicked on or otherwise selected an online advertisement.

Conventional systems for distributing online advertisements include various technological problems, both in the distribution of the online advertisement and also in the tracking of online advertisement clicks. With respect to distribution of the online advertisement, problems can occur with system latency, relevance, "tight coupling" of the advertisement platform and publisher, and project launch delays. For example, system latency can occur from distribution of online advertisements through search queries and/or emails have a negative effect on the system latency. By way of another example, the relevance of online advertisements can be decreased because advertisement ranking can differ across various items and products. By way of another example, tight coupling is required between the advertisement platform and advertisement publisher because any change in the advertisement requires changes and development effort at both the advertisement platform and the advertisement publisher. Moreover, project launch delays can occur due to longer development cycles that result from the tight coupling between the advertisement platform and the advertisement publisher.

With respect to technological problems in the tracking of online advertisements, technological problems can occur as a result of the necessity of a redirect server. Conventional advertisement systems redirect customers from the advertisement through one or more redirect servers before finally ending at the landing webpage that displays more information pertaining to the advertisement. A redirect is an instance of re-routing an electronic device from one web address to another before ending at the desired landing webpage. Redirects significantly increase latency within the advertisement system, and also result in a high drop off rate during the redirects. It is common for conventional systems to have at least four or five hops or stops during the redirect process. Moreover, a highly reliable redirect server is required in conventional advertisement systems.

Various embodiments of method 400 and related systems solve these technological problems of conventional online advertisement systems. As shall be described greater detail below with the various activities of method 400, many embodiments of method 400 allow faster integration of original and/or modified updated online advertisements by the publisher. In many embodiments, loose coupling between the advertisement publisher and the advertisement system is allowed, and advertisement publishers do not need to be aware of irrelevant advertisement components such as impression beaconing and click tracking. Moreover, in many embodiments, no code in the online advertisement is required if advertisement meta-data is modified. Furthermore, there is a significant reduction in data exchanged between the advertisement system (or advertisement platform) and the advertisement publisher(s). This significant reduction in the data exchanged between the advertisement system and the advertisement publisher improves the overall operating speed of system 300 (FIG. 3) and/or the processors of the advertisement system and the advertisement publisher(s).

In many embodiments, method 400 can comprise an activity 405 of creating a UID for an online advertisement for an item available for sale from an online retailer. The online retailer can be associated with a brick and mortar store, an exclusively online store, a warehouse, a distribution center, and/or a fulfillment center, and thus, as used herein, the term "online retailer" can include one or more of each of these entities. An item available for sale also can include items for which the online retailer is taking pre-orders, but which is not yet available for shipping, pickup, or downloading, etc.

In many embodiments, a UID is created by advertisement system 310 (FIG. 3) (or advertisement platform) of the online retailer. In some embodiments, each UID created by advertisement system 310 (FIG. 3) is created without respect to the item available for sale from the online retailer. That is, advertisement system 310 (FIG. 3) can create a plurality of UIDs which are later associated with a plurality of items after the plurality of UIDs has been created. In some embodiments, activity 405 can comprise creating, with the advertisement system, a plurality of UIDs for a plurality of online advertisements for the item available for sale from the online retailer. For example, a plurality of UIDs can be created by advertisement system 310 (FIG. 3) which will ultimately be associated with the same item, but each UID of the plurality of UIDs can be associated with a different medium of online advertisement for the same item.

In some embodiments, activity 405 also can optionally comprise an activity of combining, with advertisement system 310 (FIG. 3) of the online retailer, the UID with one or more advertisement details for the item. Thus, the advertisement details can be stored against the UID created by advertisement system 310 (FIG. 3). The advertisement details can be referred to as metadata for the advertisement and can comprise one or more of: (a) an item identification number for the item such as a universal product code (UPC), a global trade item number (GTIN), and so on; (b) a cost per click (CPC) for the item as part of an advertisement campaign that includes the item; and/or (c) a group identification for the advertisement campaign that includes the item. The advertisement details in many embodiments of method 400 are advantageous to the advertisement details required in conventional methods of distributing online advertisements. For example, conventional methods of distributing online advertisements typically require: (a) an item identification number; (b) a uniform resource locator (URL) that should be used for the item; (c) an impression beacon; (d) a campaign identification; and (e) CPC information. By requiring less metadata, some embodiments of method 400 allow system 300 (FIG. 3) to operate more efficiently.

In some embodiments, activity 405 also can optionally comprise an activity of transmitting, by advertisement system 310 (FIG. 3) of the online retailer, the one or more advertisement details for the item and the UID as combined to a queue. The queue can include advertisement messages for consumption by one or more publishers, and the advertisement messages can include the advertisement details and the UID as combined.

Method 400 also can be advantageous to conventional methods for distributing online advertisements because the advertisement details or metadata can be refreshed or modified very easily by advertisement system 310 (FIG. 3). For example, if a UPC is incorrect or a CPC for an item needs to be modified, the advertisement details can be modified at advertisement system 310 (FIG. 3). Once the advertisement details are modified, the modified advertisement details combined with the UID can be transmitted to the queue for consumption by the one or more publishers. Thus, no other interaction between advertisement system 310 (FIG. 3) and the one or more publishers is required when advertisement details are modified.

Activity 405, then, can optionally comprise an activity receiving, by advertisement system 310 (FIG. 3), one or more modified advertisement details for the item. The one or more modified advertisement details can comprise at least one of (a) a modified item identification number for the item, (b) a modified CPC for the item as part of the advertisement campaign that includes the item, and/or (c) a modified group identification for the advertisement campaign that includes the item. Activity 405 can further comprise combining, with advertisement system 310 (FIG. 3), the UID with the one or more modified advertisement details for the item, and transmitting the UID and the one or more modified advertisement details for the item, as combined, to the queue.

Method 400 also can comprise an activity 410 of publishing the online advertisement with the UID for the item in an online medium of the online retailer. In some embodiments, activity 410 can additionally or alternatively comprise coordinating displaying the online advertisement for the item in the online medium of the retailer and/or generating instructions for displaying the online advertisement on an interface of a user electronic device.

In many embodiments, the online advertisement with the UID is published by a publisher of the online retailer. The publisher can be responsible for coordinating displaying the advertisements, and can be required to consume the messages from advertisement system 310 (FIG. 3) to keep a list of eligible online advertisements. In some embodiments, the publisher can be internally employed by the online retailer to publish online advertisements. In other embodiments, the publisher can comprise an external third-party contracted by the online retailer to publish the online advertisements for the online retailer.

In many embodiments, the online advertisement is published in an online medium of the online retailer. The online medium can comprise, by way of example, a webpage on the website of the online retailer, an email sent to a customer or user from the online retailer, and/or a page on a mobile application of the online retailer downloaded to and/or installed on an electronic device of the customer or user. In many embodiments, the online medium is confined or otherwise limited to only those mediums operated by or otherwise associated with the online retailer. For example, if a user enters a search query of "diapers" on the website of the online retailer, system 300 (FIG. 3) can coordinate for display or otherwise present a plurality of items determined by system 300 (FIG. 3) to be related to diapers. Among the plurality of items also can be the online advertisement for a certain diaper product, as published by the publisher. In some embodiments, an identifier such as "sponsored product" can be displayed within the online advertisement.

The online advertisement with the UID can be published in different ways according to different embodiments. For example, in some embodiments, activity 410 can comprise publishing, with the publisher of the online retailer, the online advertisement with the UID for the item in a URL of the landing webpage in the online medium of the online retailer. Returning to the example above, if a customer clicks on or otherwise selects the online advertisement for the sponsored product of diapers, system 300 (FIG. 3) can take the user directly to a landing webpage comprising the diaper product. The URL for the landing page of the diaper product can include the UID for the diaper product.

Meanwhile, in some embodiments, activity 410 can comprise publishing, with the publisher of the online retailer, the online advertisement with the UID for the item in the online medium with additional computing instructions to automatically notify event log server 315 (FIG. 3) and/or advertisement system 310 (FIG. 3) that the landing page was displayed in response to the user selection of the online advertisement with the UID. For example, returning to the example presented above, upon taking the user to the landing page of the diaper product, the landing webpage can include JavaScript or other additional computing instructions to automatically notify or inform event log server 315 (FIG. 3) and/or advertisement system 310 (FIG. 3) that the user reached the landing webpage from the online advertisement. In some embodiments, event log server 315 (FIG. 3) is part of advertisement system 310 (FIG. 3). In other embodiments, event log server 315 (FIG. 3) is part of a system separate from advertisement system 310 (FIG. 3).

As previously noted, the online advertisement can be published in a variety of online mediums, such as but not limited to a webpage of the online retailer, an email sent to an email address of the user from the online retailer, and/or an application page of a mobile application for the online retailer. Thus, in some embodiments, activity 410 can comprise publishing, with the publisher of the online retailer, the online advertisement with the UID for the item in one or more of: (a) an additional webpage of the online retailer; (b) an email sent to an email address of the user from the online retailer; and/or (c) an application page of a mobile application of the online retailer.

In many embodiments, a different publisher can be used for each different online medium. For example, the publisher can comprise a web publisher, an email publisher, and/or a mobile application publisher. Moreover, each online medium can comprise a different UID for the same item. Activity 410, then, can further comprise one or more additional activities of: (a) publishing, with a web publisher of the online retailer, a webpage advertisement with a first UID of the plurality of UIDs for the item in the additional webpage of the online retailer; (b) publishing, with an email publisher of the online retailer, an email advertisement with a second UID of the plurality of UIDs for the item in the email sent to the email address of the user from the online retailer; and/or (c) publishing, with a mobile application publisher of the online retailer, a mobile application advertisement with a third UID of the plurality of UIDs for the item in the application page of the mobile application of the online retailer. In these embodiments and other embodiments, the first UID, the second UID, and the third UID can all be different from one another while being associated with the same item.

In some optional embodiments, activity 410 can comprise an additional activity of consuming, by the publisher of the online retailer, the UID and the one or more advertisement details for the item as combined from the queue before publishing the online advertisement with the UID for the item in an online medium of the online retailer. As used herein, consuming the UID and the one or more advertisement details can include incorporating the one or more advertisement details and the UID into the system of the publisher and storing the advertisement details and the UID in a format preferred by the publisher for serving. Consuming the one or more advertisement details and the UID also can, in some embodiments, include incorporating changes in the advertisement details and/or the UID into the caching and/or scoring systems of the publisher. Thus, activity 410 also can optionally comprise an additional activity of consuming, by the publisher of the online retailer, the UID and the one or more modified advertisement details for the item, as combined, from the queue.

Moreover, in some optional embodiments, activity 410 can comprise an additional activity of tagging the online advertisement with the UID before publishing the online advertisement with the UID for the item in an online medium of the online retailer. Tagging the online advertisement with the UID indicates that the online advertisement is an advertisement for the item published by the publisher of the online retailer and also that the UID is unique to a particular online advertisement.

In some embodiments, activity 410 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

Method 400 also can comprise an activity 415 of, in response to publishing the online advertisement, receiving, from a user electronic device, a user selection of the online advertisement with the UID. Because publishing of the UID can vary according to different embodiments, receiving a user selection of the online advertisement with the UID also can vary according to different embodiments. For example, in some embodiments, activity 415 can comprise receiving, from the user electronic device, the user selection of the online advertisement with the UID in the URL of the landing webpage. That is, a user can click on or otherwise select an advertisement, and then the user can be directed to landing page with a URL that includes the UID.

Moreover, activity 415 also can vary depending on the different online mediums of the online advertisement. For example, a user can click on or otherwise selected a webpage advertisement, an email advertisement, and/or a mobile application advertisement displayed on the user electronic device. Thus, in some embodiments activity 415 can comprise one or more of: (1) receiving, from the user electronic device, the user selection of the webpage advertisement with the first UID for the item; (2) receiving, from the user electronic device, the user selection of the email advertisement with the second UID for the item; and/or (3) receiving, from the user electronic device, the user selection of the mobile application advertisement with the third UID for the item.

Method 400 also can comprise an activity 420 of, in response to receiving the user selection, coordinating displaying a landing webpage for the item from the online retailer on an interface of the user electronic device. In some embodiments, activity 420 can additionally or alternatively comprise coordinating displaying the landing webpage for the item from the online retailer on the interface of the user electronic device and/or generating instructions for displaying the landing webpage on the interface of the user electronic device.

In many embodiments, activity 420 comprises, in response to receiving the user selection, coordinating displaying the landing webpage for the item from the online retailer on the interface of the user electronic device without one or more redirects. For example, in a conventional system, if a user selected an online advertisement, the user is typically redirected through multiple URLs and one or more redirect servers before finally landing on the landing webpage. This process of redirecting takes time and can slow the overall efficiency of the user electronic device and/or the advertisement system. In contrast to conventional systems, many embodiments of method 400 are advantageous because, upon selection of an online advertisement, a user is taken directly to the landing webpage without being redirected through any other URLs. Conventional systems requiring redirects have numerous disadvantages, including but not limited to (1) a user being unsure which URL the user is being redirected to and how his/her cookies are being shared between these numerous redirect pages, (2) negative user experiences if there are multiple redirects before reaching the landing page, and/or (3) potential opportunity losses due to user drop off before reaching the landing page.

As previously noted, the landing webpage can, in various embodiments, comprise the UID in the URL of the landing webpage and/or additional computing instructions for automatically transmitting notification to the event log server. Thus, in some embodiments, activity 420 can comprise coordinating displaying the landing webpage for the item from the online retailer on the interface of the user electronic device with the UID in the URL of the landing webpage. Alternatively or additionally, activity 420 can comprise generating instructions for displaying the landing webpage for the item on the interface of the user electronic device with the UID in the URL of the landing webpage. Moreover, in some embodiments, activity 420 can comprise coordinating displaying the landing webpage for the item from the online retailer on the interface of the user electronic device with additional computing instructions to automatically notify the event log server that the landing page was displayed in response to the user selection of the online advertisement with the UID. Alternatively or additionally, activity 420 can comprise generating instructions for displaying the landing webpage for the item from the online retailer on the interface of the user electronic device with additional computing instructions to automatically notify the event log server that the landing page was displayed in response to the user selection of the online advertisement with the UID.

Method 400 also can comprise an activity 425 of recording the user selection of the online advertisement with the UID in an event log. In some embodiments, the event log can comprise event log server 315 (FIG. 3). As noted above, event log server 315 (FIG. 3) can be a part of advertisement system 310 (FIG. 3) or platform. In other embodiments, event log server 315 (FIG. 3) can intercept event logs and publish these events to a message queue from which advertisement system 310 (FIG. 3) consumes the events in the message queue before taking appropriate actions.

Recording the user selection of the online advertisement can vary according to different embodiments of method 400. For example, user selection of a webpage advertisement, an email advertisement, and/or a mobile application advertisement can be recorded. Thus, in some embodiments, activity 425 can comprise one or more of: recording the user selection of the webpage advertisement with a first UID for the item; recording the user selection of the email advertisement with a second UID for the item; and/or recording the user selection of the mobile application advertisement with a third UID for the item. The first UID, the second UID, and the third UID can each comprise different UIDs from one another, allowing advertisement system 310 to determine from which online medium the user was directed to the landing webpage for the item.

Furthermore, recording the user selection of the advertisement also can vary according to different tracking activities of method 400. For example, in some embodiments, activity 425 can comprise recording, in the event log, the user selection of the online advertisement with the UID in the URL of the landing webpage. By way of another example, in some embodiments, activity 425 can comprise recording, in the event log on the event log server, the user selection of the online advertisement with the UID in response to receiving the notification that the landing page was displayed in response to the user selection of the online advertisement with the UID. As described above, the notification can be in response to additional computing instructions on the landing webpage and can include the UID in the notification.

Method 400 also can comprise an activity 430 of extracting the UID from the event log to track clicks of the online advertisement when published. In many embodiments, advertisement system 310 (FIG. 3) is configured to extract the UID from the event log to track clicks of the online advertisement when published. For example, advertisement system 310 can identify UIDs embedded in the URLs of landing webpages recording in the event log. Thus, in some embodiments, activity 430 can comprise identifying, with the advertisement system, the UID in the URL of the landing webpage from the event log to track the clicks of the online advertisement when published. By way of another example, advertisement system 310 (FIG. 3) can identify UIDs in notifications recorded in the event log. Thus, in some embodiments, activity 430 can comprise identifying, with the advertisement system, the notification that the landing page was displayed in response to the user selection of the online advertisement with the UID.

In many embodiments, activity 430 also can vary depending upon which online medium was used to publish the online advertisement responsible for directing the user to the landing webpage. For example, activity 430 can include extracting the UID from webpage advertisements, email advertisements, and/or mobile application advertisements. In some embodiments, activity 430 can comprise one or more of: extracting, with the advertisement system, a first UID from the event log to track first clicks of the webpage advertisement for the item when published; extracting, with the advertisement system, a second UID from the event log to track second clicks of the email advertisement for the item when published; and/or extracting, with the advertisement system, a third UID from the event log to track third clicks of the mobile application advertisement for the item with the third UID.

In many embodiments, activity 430 also can comprise an activity of retrieving information related to the UID as extracted. The information can include budget information for an advertisement campaign for an item tied to the UID, supplier information for the item, and/or impression beacon information. In some embodiments, activity 430 can optionally further comprise an activity of notifying, with advertisement system 310 (FIG. 3), a partner of the online retailer that is associated with the item of the clicks of the online advertisement based on the clicks of the online advertisement when published. Such a notification can occur in response to the clicks of the online advertisement tracked by extracting the UID from the event log. Moreover, in some embodiments, activity 430 also can optionally further comprise an activity of modifying, with advertisement system 310 (FIG. 3), a budget for an advertisement campaign for the item based on the clicks of the online advertisement when published.

FIG. 5 illustrates a block diagram of a portion of system 300 comprising advertisement system 310, event log server 315, web server 320, display system 360, web publisher system 370, email publisher system 380, and mobile publisher system 390, according to the embodiment shown in FIG. 3. Each of advertisement system 310, event log server 315, web server 320, display system 360, web publisher system 370, email publisher system 380, and mobile publisher system 390 is merely exemplary and not limited to the embodiments presented herein. Each of advertisement system 310, event log server 315, web server 320, display system 360, web publisher system 370, email publisher system 380, and/or mobile publisher system 390 can be employed in many different embodiments or examples not specifically depicted or described herein. In some embodiments, certain elements or modules of advertisement system 310, event log server 315, web server 320, display system 360, web publisher system 370, email publisher system 380, and/or mobile publisher system 390 can perform various procedures, processes, and/or acts. In other embodiments, the procedures, processes, and/or acts can be performed by other suitable elements or modules.

In many embodiments, advertisement system 310 can comprise non-transitory memory storage module 512. Memory storage module 512 can be referred to as advertisement module 512. In many embodiments, advertisement module 512 can store computing instructions configured to run on one or more processing modules and perform one or more acts of method 400 (FIG. 4) (e.g., activity 405 of creating a UID for an online advertisement for an item available for sale from an online retailer (FIG. 4), and activity 430 of extracting the UID from the event log to track clicks of the online advertisement when published (FIG. 4)).

In many embodiments, event log server 315 can store computing instructions configured to run on one or more processing modules and perform one or more acts of method 400 (FIG. 4) (e.g., activity 425 of recording the user selection of the online advertisement with the UID in an event log (FIG. 4)). In many embodiments, event log server 315 can be a part of advertisement system 310.

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4) (e.g., activity 420 of, in response to receiving the user selection, coordinating displaying a landing webpage for the item from the online retailer on an interface of the user electronic device (FIG. 4)).

In many embodiments, web publisher system 370 can comprise non-transitory memory storage module 572. Memory storage module 572 can be referred to as web publisher module 572. In many embodiments, web publisher module 572 can store computing instructions configured to run on one or more processing module and perform one or more acts of method 400 (FIG. 4) (e.g., activity 410 of publishing the online advertisement with the UID for the item in an online medium of the online retailer (FIG. 4) or, more specifically, an activity of publishing a webpage advertisement with a first UID of the plurality of UIDs for the item in the additional webpage of the online retailer; and activity 415 of, in response to publishing the online advertisement, receiving, from a user electronic device, a user selection of the online advertisement with the UID (FIG. 4)).

In many embodiments, email publisher system 380 can comprise non-transitory memory storage module 582. Memory storage module 582 can be referred to as email publisher module 582. In many embodiments, email publisher module 582 can store computing instructions configured to run on one or more processing module and perform one or more acts of method 400 (FIG. 4) (e.g., activity 410 of publishing the online advertisement with the UID for the item in an online medium of the online retailer (FIG. 4) or, more specifically, an activity of publishing an email advertisement with a second UID of the plurality of UIDs for the item in the email sent to the email address of the user from the online retailer; and activity 415 of, in response to publishing the online advertisement, receiving, from a user electronic device, a user selection of the online advertisement with the UID (FIG. 4)).

In many embodiments, mobile publisher system 390 can comprise non-transitory memory storage module 592. Memory storage module 592 can be referred to as mobile publisher module 592. In many embodiments, mobile publisher module 592 can store computing instructions configured to run on one or more processing module and perform one or more acts of method 400 (FIG. 4) (e.g., activity 410 of publishing the online advertisement with the UID for the item in an online medium of the online retailer (FIG. 4) or, more specifically, an activity of publishing a mobile application advertisement with a third UID of the plurality of UIDs for the item in the application page of the mobile application of the online retailer; and activity 415 of, in response to publishing the online advertisement, receiving, from a user electronic device, a user selection of the online advertisement with the UID (FIG. 4)).

Figure 6:
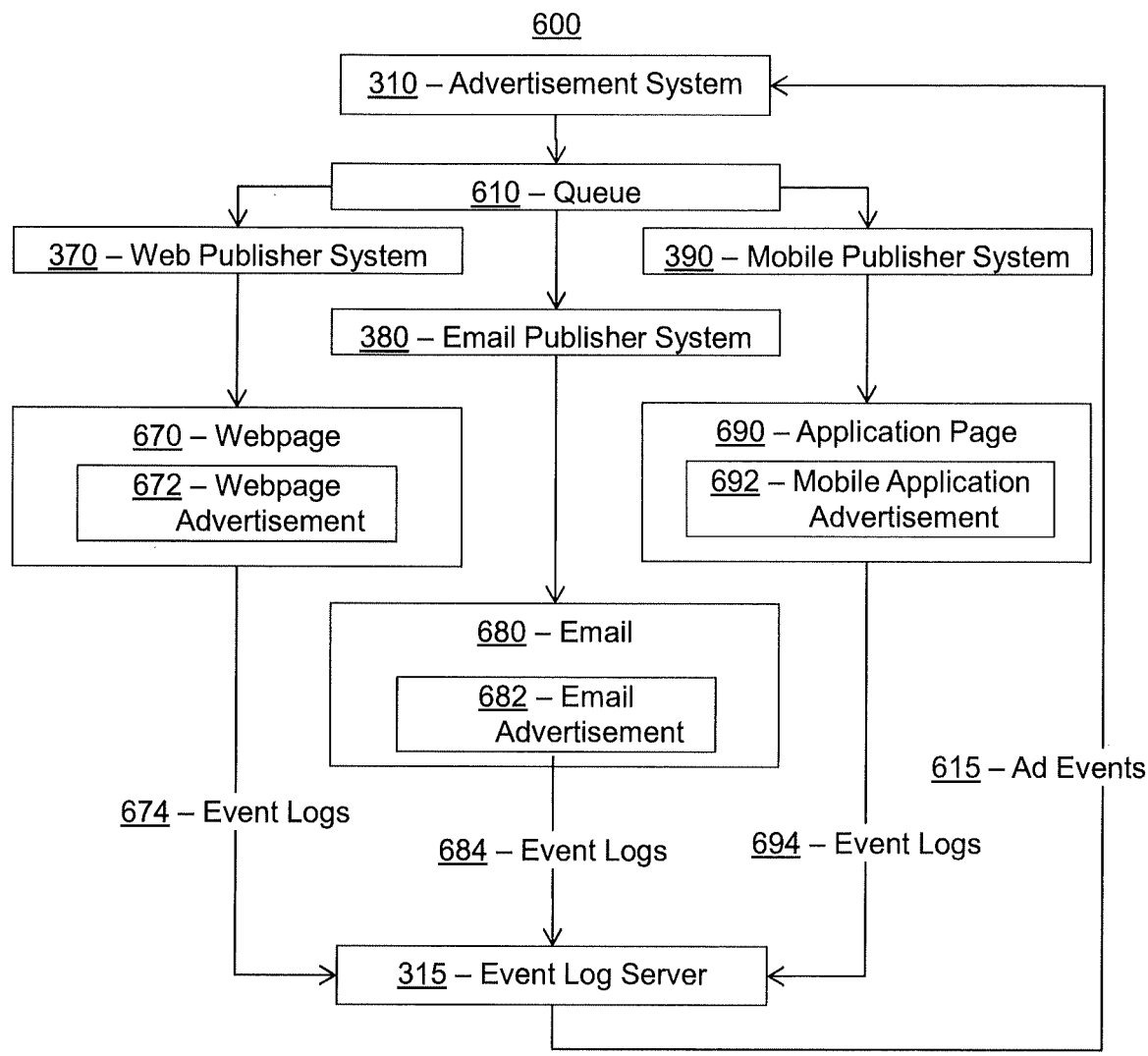
FIG. 6 is a block diagram flowchart, according to certain embodiments.

FIG. 6 is a block diagram flowchart 600, according to certain embodiments. While advertisement system 310, event log server 315, web publisher system 370, email publisher system 380, and mobile publisher system 390 are shown in FIG. 6, other embodiments can include one or more of the computers described in relation to FIGS. 1 and 2. In many embodiments, advertisement system 310 can transmit advertisement UID enriched items into a queue 610 for retrieval by one or more of web publisher system 370, email publisher system 380, and/or mobile publisher system 390. The advertisement UID enriched items can comprise, as described in greater detail above, an item identification for an item, CPC information for the item, and the UID. Once the advertisement UID enriched items have been consumed by the publishers, the publishes can publish advertisements with the UID for the item in the respective online mediums. For example, web publisher system 370 can publish a webpage advertisement 672 on a webpage 670 of the online retailer, email publisher system 380 can publish an email advertisement 682 in an email 680 sent to one or more users from the online retailer, and/or mobile publisher system 390 can publish a mobile application advertisement 692 on an application page 690 of the online retailer.

When users click on or otherwise select the online advertisements, activity logs detailing the selection can be recorded on event log server 315. In some embodiments, event logs also can detail display of an online advertisement even if a user did not click on or otherwise select the online advertisement displayed. Event logs also can include the UID associated with each respective online advertisement. More particularly, event logs 674 can detail display and/or selection of webpage advertisements 672, event logs 684 can detail display and/or selection of email advertisements 682, and event logs 694 can detail display and/or selection of mobile application advertisements 692. Event logs 674, 684, and 694 can be stored or otherwise recorded in event log server 315. Advertisement system 310 can then extract advertisement events 615 from event log server 315. Advertisement events 615 can include information regarding display and selection of webpage advertisements 672 with accompanying UIDs, email advertisements 682 with accompanying UIDs, and/or mobile application advertisements 692 with accompanying UIDs.

Although systems and methods for distributing online advertisements have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory storage devices storing computing instructions configured to run on the one or more processors and perform:
creating, with an advertisement system of an online retailer, one or more unique identifications (UIDs) for one or more online advertisements for an item available for sale from the online retailer, wherein each respective unique identification (UID) of the one or more UIDs corresponds with a respective online delivery medium of one or more online delivery mediums for a respective online advertisement of the one or more online advertisements for the item;

constructing, by a publisher system of a publisher, a list of eligible online advertisements comprising the respective online advertisement;
allowing the publisher system of the publisher to publish only a portion of the list of eligible online advertisements comprising the respective online advertisement with a respective UID for the item in the respective online delivery medium, wherein the one or more UIDs comprise the respective UID;
receiving, from a user electronic device of a user, a user selection of the respective online advertisement with the respective UID, as published;
in response to receiving the user selection:
coordinating displaying, without using one or more redirects, a landing webpage for the item from the online retailer on an interface of the user electronic device, wherein:
the landing webpage for the item is located at a uniform resource locator (URL); and
the respective UID is embedded within the URL; and
recording the user selection of the respective online advertisement with the respective UID in an event log;
extracting, with the advertisement system of the online retailer, selections of the respective UID from the event log to track clicks of the respective online advertisement when published in the respective online delivery medium;
retrieving information related to the respective UID comprising:
budget information for an advertisement campaign that includes the item;
supplier information for the item; and
impression beacon information for the respective online advertisement with the respective UID, as published;
receiving, by the advertisement system of the online retailer, one or more modified advertisement details for the item, the one or more modified advertisement details comprising:
(a) a modified item identification number for the item, the modified item identification number being different than the respective UID;
(b) a modified cost per click for the item as part of the advertisement campaign that includes the item; and
(c) a modified group identification for the advertisement campaign that includes the item;
combining, by the advertisement system of the online retailer, the respective UID with one or more corresponding respective modified advertisement details of the one or more modified advertisement details for the item; and
allowing the publisher system of the publisher to publish a modified online advertisement with the respective UID for the item in the respective online delivery medium, the modified online advertisement comprising the respective UID and the one or more corresponding respective modified advertisement details of the one or more modified advertisement details, as combined.

2. The system of claim 1, wherein creating, with the advertisement system of the online retailer, the one or more UIDs for the one or more online advertisements for the item available for sale from the online retailer comprises:

combining, with the advertisement system of the online retailer, each respective UID of the one or more UIDs with one or more advertisement details for the item, each respective advertisement detail of the one or more advertisement details comprising at least one of:
(a) an item identification number for the item;
(b) a cost per click for the item as part of the advertisement campaign that includes the item; or
(c) a group identification for the advertisement campaign that includes the item.

3. The system of claim 2, wherein allowing the publisher system of the publisher to publish only a portion of the list of eligible online advertisements comprising the respective online advertisement comprises:
transmitting, by the advertisement system of the online retailer, the respective UID and one or more respective advertisement details for the item, as combined, to a queue;
consuming, by the publisher system of the publisher, the respective UID and the one or more respective advertisement details for the item, as combined, from the queue; and
tagging the respective online advertisement with the respective UID.

4. The system of claim 3, wherein:
allowing the publisher system of the publisher to publish the modified online advertisement further comprises:
transmitting, by the advertisement system of the online retailer, the respective UID and the one or more corresponding respective modified advertisement details for the item, as combined, to the queue; and
consuming, by the publisher system of the publisher, the respective UID and the one or more corresponding respective modified advertisement details for the item, as combined, from the queue.

5. The system of claim 1, wherein:
allowing the publisher system of the publisher to publish only a portion of the list of eligible online advertisements comprising the respective online advertisement with the respective UID for the item in the respective online delivery medium comprises:
publishing, with the publisher system of the publisher, the respective online advertisement in the respective online delivery medium, wherein:
the respective online advertisement comprises a hyperlink to the landing webpage for the item;
the hyperlink is embedded in at least a portion of the respective online advertisement; and
the hyperlink comprises the URL of the landing webpage;
receiving, from the user electronic device, the user selection of the respective online advertisement with the respective UID comprises:
receiving, from the user electronic device, the user selection of the at least the portion of the respective online advertisement;
coordinating displaying, without using the one or more redirects, the landing webpage for the item from the online retailer on the interface of the user electronic device comprises:
coordinating displaying, without using the one or more redirects, the landing webpage for the item from the online retailer on the interface of the user electronic device with the respective UID being part of the URL of the landing webpage;

recording the user selection of the respective online advertisement with the respective UID in the event log comprises:
recording, in the event log, the user selection of the respective online advertisement with the respective UID being part of the URL of the landing webpage; and
extracting, with the advertisement system of the online retailer, the selections of the respective UID from the event log to track the clicks of the respective online advertisement when published in the respective online delivery medium comprises:
identifying, with the advertisement system of the online retailer, the respective UID in the URL of the landing webpage from the event log to track the clicks of the respective online advertisement when published in the respective online delivery medium.

6. The system of claim 1, wherein:
allowing the publisher system of the publisher to publish only a portion of the list of eligible online advertisements comprising the respective online advertisement with the respective UID for the item in the respective online delivery medium comprises:
publishing, with the publisher system of the publisher, the respective online advertisement with the respective UID for the item in the respective online delivery medium with additional computing instructions to automatically notify an event log server that the landing webpage was displayed in response to the user selection of the respective online advertisement with the respective UID;
coordinating displaying, without using the one or more redirects, the landing webpage for the item from the online retailer on the interface of the user electronic device comprises:
coordinating displaying, without using the one or more redirects, the landing webpage for the item from the online retailer on the interface of the user electronic device with additional computing instructions configured to run on the one or more processors and perform automatically notifying the event log server that the landing webpage was displayed in response to the user selection of the respective online advertisement with the respective UID;
recording the user selection of the respective online advertisement with the respective UID in the event log comprises:
recording, in the event log on the event log server, the user selection of the respective online advertisement with the respective UID in response to receiving a notification that the landing webpage was displayed in response to the user selection of the respective online advertisement with the respective UID; and
extracting, with the advertisement system of the online retailer, the selections of the respective UID from the event log to track the clicks of the respective online advertisement when published in the respective online delivery medium comprises:
identifying, with the advertisement system of the online retailer, the notification that the landing webpage was displayed in response to the user selection of the respective online advertisement with the respective UID.

7. The system of claim 1, wherein the respective online delivery medium comprises:
(a) an additional webpage of the online retailer;
(b) an email sent to an email address of the user from the online retailer; or
(c) an application page of a mobile application of the online retailer.

8. The system of claim 7, wherein:
allowing the publisher system of the publisher to publish only a portion of the list of eligible online advertisements comprising the respective online advertisement with the respective UID for the item in the respective online delivery medium comprises one or more of:
publishing, with a web publisher system of the publisher, a webpage advertisement on only the portion of the list of eligible online advertisements with a first UID of the one or more UIDs for the item in the additional webpage of the online retailer;
publishing, with an email publisher system of the publisher, an email advertisement on only the portion of the list of eligible online advertisements with a second UID of the one or more UIDs for the item in the email sent to the email address of the user from the online retailer; or
publishing, with a mobile application publisher system of the publisher, a mobile application advertisement on only the portion of the list of eligible online advertisements with a third UID of the one or more UIDs for the item in the application page of the mobile application of the online retailer;
receiving, from the user electronic device, the user selection of the respective online advertisement with the respective UID comprises one or more of:
receiving, from the user electronic device, the user selection of the webpage advertisement with the first UID for the item;
receiving, from the user electronic device, the user selection of the email advertisement with the second UID for the item; or
receiving, from the user electronic device, the user selection of the mobile application advertisement with the third UID for the item;
recording the user selection of the respective online advertisement with the respective UID in the event log comprises one or more of:
recording the user selection of the webpage advertisement with the first UID for the item;
recording the user selection of the email advertisement with the second UID for the item; or
recording the user selection of the mobile application advertisement with the third UID for the item; and
extracting, with the advertisement system of the online retailer, the selections of the respective UID from the event log to track the clicks of the respective online advertisement when published in the respective online delivery medium comprises one or more of:
extracting, with the advertisement system of the online retailer, the first UID from the event log to track first clicks of the webpage advertisement for the item when published with the web publisher system of the publisher;
extracting, with the advertisement system of the online retailer, the second UID from the event log to track second clicks of the email advertisement for the item when published with the email publisher system of the publisher; or
extracting, with the advertisement system of the online retailer, the third UID from the event log to track third clicks of the mobile application advertisement for the item when published with the mobile application publisher system of the publisher.

9. The system of claim 1, wherein the one or more non-transitory storage devices storing the computing instructions are further configured to run on the one or more processors and perform, in response to extracting the selections of the respective UID from the event log:

notifying, with the advertisement system of the online retailer, a partner of the online retailer associated with the item of the clicks of the respective online advertisement when published in the respective online delivery medium; and modifying, with the advertisement system of the online retailer, the budget information for the advertisement campaign for the item based on the clicks of the respective online advertisement when published in the respective online delivery medium.

10. A method being implemented via execution of computing instructions configured to run at one or more processors and configured to be stored at non-transitory computer-readable media, the method comprising:

creating, with an advertisement system of an online retailer, one or more unique identifications (UIDs) for one or more online advertisements for an item available for sale from the online retailer, wherein each respective unique identification (UID) of the one or more UIDs corresponds with a respective online delivery medium of one or more online delivery mediums for a respective online advertisement of the one or more online advertisements for the item;

constructing, by a publisher system of a publisher, a list of eligible online advertisements comprising the respective online advertisement;

allowing the publisher system of the publisher to publish only a portion of the list of eligible online advertisements comprising the respective online advertisement with a respective UID for the item in the respective online delivery medium, wherein the one or more UIDs comprise the respective UID;

receiving, from a user electronic device of a user, a user selection of the respective online advertisement with the respective UID, as published;

in response to receiving the user selection:
coordinating displaying, without using one or more redirects, a landing webpage for the item from the online retailer on an interface of the user electronic device, wherein:
the landing webpage for the item is located at a uniform resource locator (URL); and
the respective UID is embedded within the URL; and
recording the user selection of the respective online advertisement with the respective UID in an event log;

extracting, with the advertisement system of the online retailer, selections of the respective UID from the event log to track clicks of the respective online advertisement when published in the respective online delivery medium;

retrieving information related to the respective UID comprising:
budget information for an advertisement campaign that includes the item;
supplier information for the item; and
impression beacon information for the respective online advertisement with the respective UID, as published;

receiving, by the advertisement system of the online retailer, one or more modified advertisement details for the item, the one or more modified advertisement details comprising:
(a) a modified item identification number for the item, the modified item identification number being different than the respective UID;
(b) a modified cost per click for the item as part of the advertisement campaign that includes the item; and
(c) a modified group identification for the advertisement campaign that includes the item;

combining, by the advertisement system of the online retailer, the respective UID with one or more corresponding respective modified advertisement details of the one or more modified advertisement details for the item; and allowing the publisher system of the publisher to publish a modified online advertisement with the respective UID for the item in the respective online delivery medium, the modified online advertisement comprising the respective UID and the one or more corresponding respective modified advertisement details of the one or more modified advertisement details, as combined.

11. The method of claim 10, wherein creating, with the advertisement system of the online retailer, the one or more UIDs for the one or more online advertisements for the item available for sale from the online retailer comprises:

combining, with the advertisement system of the online retailer, each respective UID of the one or more UIDs with one or more advertisement details for the item, each respective advertisement detail of the one or more advertisement details comprising at least one of:
(a) an item identification number for the item;
(b) a cost per click for the item as part of the advertisement campaign that includes the item; or
(c) a group identification for the advertisement campaign that includes the item.

12. The method of claim 11, wherein allowing the publisher system of the publisher to publish only a portion of the list of eligible online advertisements comprising the respective online advertisement comprises:

transmitting, by the advertisement system of the online retailer, the respective UID and one or more respective advertisement details for the item, as combined, to a queue;

consuming, by the publisher system of the publisher, the respective UID and the one or more respective advertisement details for the item, as combined, from the queue; and tagging the respective online advertisement with the respective UID.

13. The method of claim 12, wherein:

allowing the publisher system of the publisher to publish the modified online advertisement further comprises:
transmitting, by the advertisement system of the online retailer, the respective UID and the one or more corresponding respective modified advertisement details for the item, as combined, to the queue; and
consuming, by the publisher system of the publisher, the respective UID and the one or more corresponding respective modified advertisement details for the item, as combined, from the queue.

14. The method of claim 10, wherein:

allowing the publisher system of the publisher to publish only a portion of the list of eligible online advertisements comprising the respective online advertisement with the respective UID for the item in the respective online delivery medium comprises:
publishing, with the publisher system of the publisher, the respective online advertisement in the respective online delivery medium, wherein:
the respective online advertisement comprises a hyperlink to the landing webpage for the item;
the hyperlink is embedded in at least a portion of the respective online advertisement; and
the hyperlink comprises the URL of the landing webpage;

receiving, from the user electronic device, the user selection of the respective online advertisement with the respective UID comprises:

receiving, from the user electronic device, the user selection of the at least the portion of the respective online advertisement;

coordinating displaying, without using the one or more redirects, the landing webpage for the item from the online retailer on the interface of the user electronic device comprises:

coordinating displaying, without using the one or more redirects, the landing webpage for the item from the online retailer on the interface of the user electronic device with the respective UID being part of the URL of the landing webpage;

recording the user selection of the respective online advertisement with the respective UID in the event log comprises:

recording, in the event log, the user selection of the respective online advertisement with the respective UID being part of the URL of the landing webpage; and extracting, with the advertisement system of the online retailer, the selections of the respective UID from the event log to track the clicks of the respective online advertisement when published in the respective online delivery medium comprises:

identifying, with the advertisement system of the online retailer, the respective UID in the URL of the landing webpage from the event log to track the clicks of the respective online advertisement when published in the respective online delivery medium.

15. The method of claim 10, wherein:

allowing the publisher system of the publisher to publish only a portion of the list of eligible online advertisements comprising the respective online advertisement with the respective UID for the item in the respective online delivery medium comprises:

publishing, with the publisher system of the publisher, the respective online advertisement with the respective UID for the item in the respective online delivery medium with additional computing instructions to automatically notify an event log server that the landing webpage was displayed in response to the user selection of the respective online advertisement with the respective UID;

coordinating displaying, without using the one or more redirects, the landing webpage for the item from the online retailer on the interface of the user electronic device comprises:

coordinating displaying, without using the one or more redirects, the landing webpage for the item from the online retailer on the interface of the user electronic device with additional computing instructions configured to run on the one or more processors and perform automatically notifying the event log server that the landing webpage was displayed in response to the user selection of the respective online advertisement with the respective UID;

recording the user selection of the respective online advertisement with the respective UID in the event log comprises:

recording, in the event log on the event log server, the user selection of the respective online advertisement with the respective UID in response to receiving a notification that the landing webpage was displayed in response to the user selection of the respective online advertisement with the respective UID; and extracting, with the advertisement system of the online retailer, the selections of the respective UID from the event log to track the clicks of the respective online advertisement when published in the respective online delivery medium comprises:

identifying, with the advertisement system of the online retailer, the notification that the landing webpage was displayed in response to the user selection of the respective online advertisement with the respective UID.

16. The method of claim 10, wherein the respective online delivery medium comprises:

(a) an additional webpage of the online retailer;

(b) an email sent to an email address of the user from the online retailer; or (c) an application page of a mobile application of the online retailer.

17. The method of claim 16, wherein:

allowing the publisher system of the publisher to publish only the portion the list of eligible online advertisements comprising the respective online advertisement with the respective UID for the item in the respective online delivery medium comprises one or more of:

publishing, with a web publisher system of the publisher, a webpage advertisement on only the portion of the list of eligible online advertisements with a first UID of the one or more UIDs for the item in the additional webpage of the online retailer;

publishing, with an email publisher system of the publisher, an email advertisement on only the portion of the list of eligible online advertisements with a second UID of the one or more UIDs for the item in the email sent to the email address of the user from the online retailer; or publishing, with a mobile application publisher system of the publisher, a mobile application advertisement on only the portion of the list of eligible online advertisements with a third UID of the one or more UIDs for the item in the application page of the mobile application of the online retailer;

receiving, from the user electronic device, the user selection of the respective online advertisement with the respective UID comprises one or more of:

receiving, from the user electronic device, the user selection of the webpage advertisement with the first UID for the item;

receiving, from the user electronic device, the user selection of the email advertisement with the second UID for the item; or receiving, from the user electronic device, the user selection of the mobile application advertisement with the third UID for the item;

recording the user selection of the respective online advertisement with the respective UID in the event log comprises one or more of:

recording the user selection of the webpage advertisement with the first UID for the item;

recording the user selection of the email advertisement with the second UID for the item; or recording the user selection of the mobile application advertisement with the third UID for the item; and extracting, with the advertisement system of the online retailer, the selections of the respective UID from the event log to track the clicks of the respective online advertisement when published in the respective online delivery medium comprises one or more of:

extracting, with the advertisement system of the online retailer, the first UID from the event log to track first clicks of the webpage advertisement for the item when published with the web publisher system of the publisher;

extracting, with the advertisement system of the online retailer, the second UID from the event log to track second clicks of the email advertisement for the item when published with the email publisher system of the publisher; or extracting, with the advertisement system of the online retailer, the third UID from the event log to track third clicks of the mobile application advertisement for the item when published with the mobile application publisher system of the publisher.

18. The method of claim 10, further comprising, in response to extracting the selections of the respective UID from the event log:

notifying, with the advertisement system of the online retailer, a partner of the online retailer associated with the item of the clicks of the respective online advertisement when published in the respective online delivery medium; and modifying, with the advertisement system of the online retailer, the budget information for the advertisement campaign for the item based on the clicks of the respective online advertisement when published in the respective online delivery medium.

19. The system of claim 1, wherein the publisher system of the publisher comprises at least one of:

a publishing system internal to the online retailer; or a publishing system external to the online retailer.

20. The system of claim 10, wherein the publisher system of the publisher comprises at least one of:

a publishing system internal to the online retailer; or a publishing system external to the online retailer.

* * * * *